United States Patent [19]

Johnsen et al.

[11] Patent Number: 4,640,434
[45] Date of Patent: Feb. 3, 1987

[54] PLUG FOR HOLE SEALING

[75] Inventors: Kenneth D. Johnsen, Worthington; Alan J. Fletcher, Columbus, both of Ohio

[73] Assignee: Rockwell International Corporation, El Segundo, Calif.

[21] Appl. No.: 831,883

[22] Filed: Feb. 24, 1986

[51] Int. Cl.$^4$ .............................................. B65D 51/00
[52] U.S. Cl. .................................. 220/287; 220/307; 220/DIG. 19
[58] Field of Search ............... 220/287, DIG. 19, 239, 220/307; 215/255; 138/97

[56] References Cited
U.S. PATENT DOCUMENTS 3,659,738 5/1972 Friedmann et al. ......... 220/DIG. 19

Primary Examiner—George T. Hall
Attorney, Agent, or Firm—Charles T. Silberberg; Max Geldin

[57] ABSTRACT

A plug for sealing holes, particularly in aircraft fuel tanks, having an elastomeric tapered body member of circular or rectangular cross-section, formed of a plurality of integral tapered portions of successively reduced taper extending substantially from one end to the other end of the body member, each tapered portion having an exposed outer edge, providing a tapered and barbed configuration. A lead-in tip is provided at the tapered end of the body member. In use, the plug is inserted into and pulled through a hole to be plugged and into tight contact with the inner surfaces and edges of the hole. When the tensile pull is relaxed, this allows the plug to expand into contact with and grip the inside hole surfaces and hole edges, to form a positive seal. Excess plug material is trimmed off on one or both sides of the hole, and a coating of sealant material can be applied on the outer surfaces of the trimmed plug at opposite sides of the hole for additional sealing.

15 Claims, 6 Drawing Figures

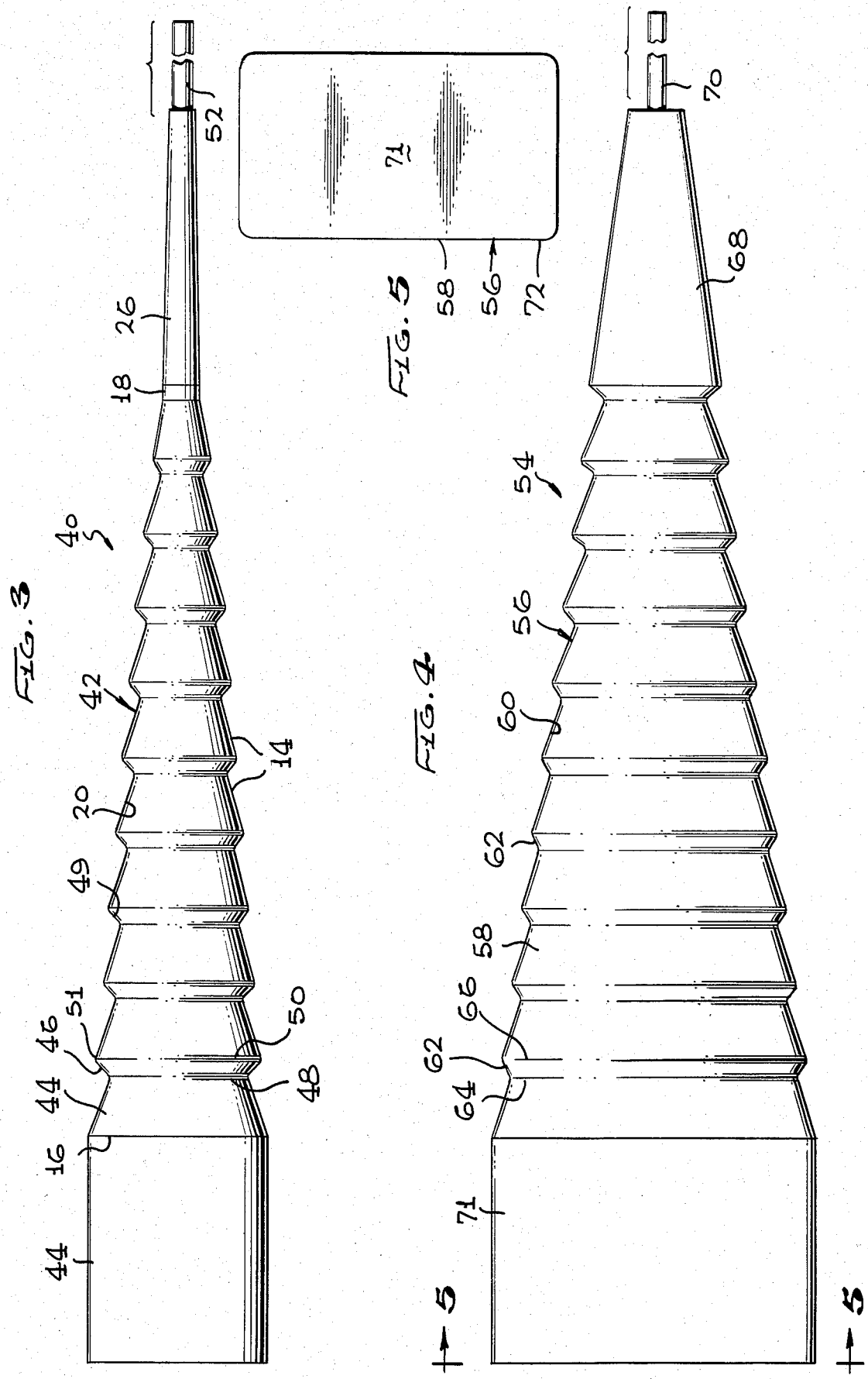

PLUG FOR HOLE SEALING

BACKGROUND OF THE INVENTION

The present invention relates to a plug for sealing holes in structures such as fluid containers, and is particularly directed to a plug for aircraft fuel tank sealing.

Current devices to plug normal structural holes in integral metal fuel tanks requires the time consuming installation of a mechanically attached mesh screen patch overcoated with a sealant. However, securing the screen patch in corners and other relatively inaccessible locations is tedious and expensive from a labor time aspect.

The prior art discloses various types of plug for sealing purposes. U.S. Pat. No. 2,739,352, for example, discloses a plug for tire repairing having a stem on which are formed a plurality of like tapered fins. Prior art plugs of this general type are used for plugging leaking tires against a rubber structure, not a metal structure, and they seal against pressurized air, not a liquid such as a liquid fuel.

U.S. Pat. Nos. 4,058,234 and 4,160,465 are exemplary of prior art plugs used for sealing leaking containers. U.S. Pat. No. 4,058,234 uses elaborate equipment to pump foam into a sponge to seal a hole in a ruptured container. U.S. Pat. No. 4,160,465 utilizes a porous fabric bag filled with powder that swells when placed in contact with water, as a temporary plug for a leaking hole in a water tank. These plugs, however, are not feasible or practical for use in sealing fuel tank holes.

It is an object of the present invention to provide an improved reliable plug for sealing holes in metal containers.

Another object of the invention is the provision of a plug of the above type which is simple in design, is relatively inexpensive and which is readily manipulated to plug a hole in a metal structure.

Yet another object is to provide a plug of flexible resilient material for use in sealing holes in metal aircraft fuel tanks, e.g. irregularly shaped holes, holes resulting from structural joints and holes of various sizes, while resisting the corrosiveness of the fuel.

SUMMARY OF THE INVENTION

According to the invention, there is provided a plug for hole sealing formed from an elastomeric or rubber-like flexible material having a tapered and barbed configuration, which gives it the unique feature of being able to squeeze into a variety of hole sizes and to lock in place therein.

The plug has an elastomeric solid tapered body member formed of a plurality of integral tapered portions of successively reduced taper extending substantially from one end to the other end of the body member, each tapered portion having an exposed outer edge, providing a tapered and barbed configuration. A lead-in tip is formed integral with the body member at the tapered end thereof, that is the end having the smallest tapered portion. A wire can be connected to the lead-in tip to facilitate entry of the plug into a container hole, particularly a hole in a metal aircraft fuel tank.

In a preferred embodiment a shoulder member is provided between the larger end of each tapered portion and the smaller end of the adjacent tapered portion. Such shoulder portion is tapered or is inclined in a direction opposite to the main direction of taper of the tapered portions.

The elongated body member of the plug and the tapered portions thereof can have any desired cross section, e.g. circular or rectangular. The elastomeric material of which the plug is formed is non-corrosive and is fuel resistant.

The tapered and barbed configuration is designed to secure the plug in a hole or opening in a metal, e.g. sheet metal, container, particularly of an aircraft fuel tank. The wire and lead-in tip permit easy and quick insertion into the opening. Pulling the plug stretches the tapered portions of the plug into tight contact with the surfaces and edges of the hole, even if the hole is of irregular shape. Relaxing tensile pull allows such tapered portions to expand and maintain outward pressure against the hole surfaces and edges.

Excess material on each side of the plug is trimmed off, and if considered desirable, a sealant overcoat can be applied.

The plug of the invention reduces plug installation costs and provides a more positive seal as compared to currently employed devices for plugging holes in aircraft fuel tanks, namely, the time-consuming arrangement of mesh screen material wired into place and impregnated with sealant. None of the plugs of the prior art patents, to applicants' knowledge, possess the locking tapered/barbed concept of the plug of the present invention, nor could they be used to seal irregularly shaped holes, e.g. corner holes, in aircraft fuel tanks.

BRIEF DESCRIPTION OF THE DRAWINGS

A better understanding of the invention may be had by reference to the following detailed description, taken in conjunction with the accompanying drawings wherein:

FIG. 3 is a plan view of a preferred embodiment of the invention plug;

FIG. 4 is a plan view of another embodiment of the invention plug, which has a rectangular shaped cross section; and FIG. 5 is an end view taken on line 5—5 of FIG. 4.

DETAILED DESCRIPTION OF THE INVENTION AND PREFERRED EMBODIMENTS

Figure 1:
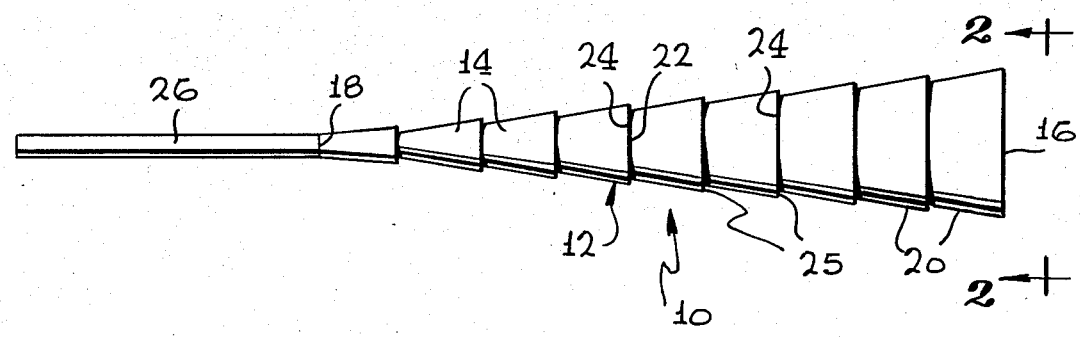
FIG. 1 is a plan view of one embodiment of the tapered and barbed plug of the invention.
Figure 2:
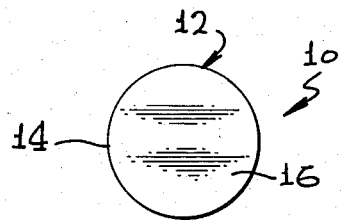
FIG. 2 is an end view taken on line 2—2 of FIG. 1.

Referring to FIGS. 1 and 2, the plug 10 of the invention is formed of an elastomeric or rubber-like material which is flexible and resilient. Any suitable rubber or synthetic elastomeric material can be utilized, but a molded rubber plug has been found particularly satisfactory, and the invention is described hereinafter in terms of such preferred molded rubber plug.

The rubber plug 10 comprises a solid tapered elongated body member 12 of circular cross-section, formed of a plurality or series of integral axially disposed tapered portions 14 extending substantially from one end to the other end of the body member. Each of the tapered portions 14 has a successively reduced taper in radial extent from the large end 16 of the tapered body member to the small end 18 thereof, and each of the tapered portions preferably has the same angle of inwardly reducing radial taper, as indicated at 20.

The tapered portions 14 are each truncated, the large end 22 of each tapered portion being larger in radial extent than the tapered end 24 of the adjacent tapered portion. Thus, the larger end 22 of each tapered portion 14 has an exposed outer edge 25 which forms a barb and locking member between adjacent tapered portions 14, as the plug is drawn through a hole in a structure, as described in greater detail below. The tapered and barbed configuration of the plug, as illustrated in FIG. 1, aids in securing and locking the plug in an opening of a metal structure or container.

A lead-in tip 26 is integrally connected to the body member 12 of the plug at the reduced or tapered end 18 thereof, to facilitate easy and quick insertion of the plug into an opening.

Figure 2A:
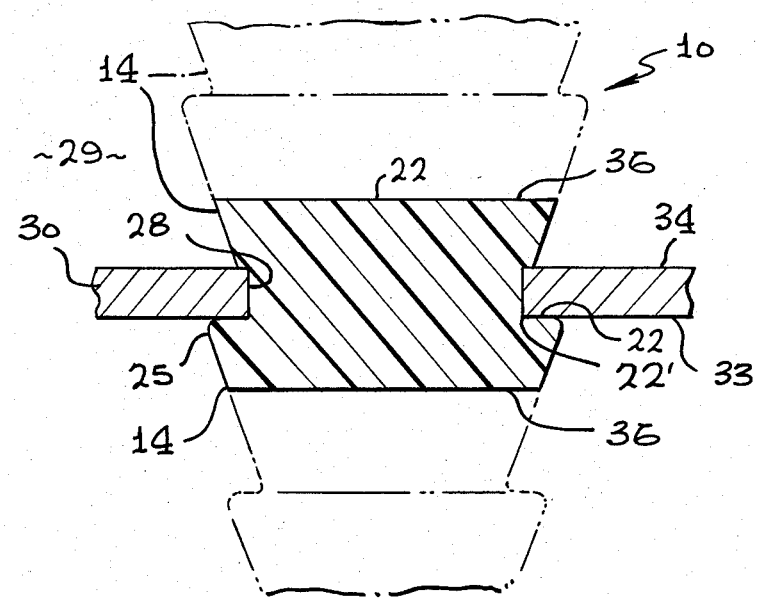
FIG. 2a illustrates the use of the plug of FIGS. 1 and 2 for sealing a hole in a metal structure such as a fuel tank.

Thus, referring to FIG. 2a, numeral 28 indicates a hole in a sheet metal aircraft fuel tank 30, to be plugged. The lead-in tip 26 of the rubber plug 10 is passed through the hole 28 in a downward direction, usually from the inside of the tank indicated at 29, as viewed in FIG. 2a. Pulling the plug downward through the hole 28 causes the outer edge or barb 25 at the large end of one or more of the tapered portions 14 of the plug to extrude through the hole and resist upward or reverse displacement of the rubber plug 10. Pulling the plug 10 with deliberate force stretches the rubber temporarily into a smaller diameter at 22', allowing the largest possible diameter at 25 to be pulled through the hole.

Relaxing tensile pull allows the plug to expand and securely lock a barb 25 on the normally low pressure side of the hole to resist reverse displacement in the event of pressure reversal or other external forces. The tapered portion 14 and larger diameter at 22 of the plug within the tank 29 and above the hole serves to prevent displacement of the plug from the normally high pressure side of the tank wall 30 down through the hole 28. Thus, the tapered portion 14 of the plug within and extending above hole 28 prevents downward displacement of the plug, and barb 25 on the large diameter 22 of the adjacent tapered portion 14 extending just below the hole prevents upward displacement of the plug.

It is noted that the elastomeric or molded rubber plug has sufficient flexibility to readily stretch so that one or more of the tapered portions 14 make tight contact with the surfaces and edges of the hole as the plug is pulled through the hole, as noted above, but has sufficient resilience and stiffness to permit expansion and resulting tight engagement of the tapered portions of the plug with the surfaces and edges of the hole, when tensile pull on the plug is relaxed, to maintain outward pressure against the hole to tightly seal same. The rubber plug of the invention, in this respect, is particularly advantageous for sealing irregular holes.

When the plug is thus tightly engaged in the hole, excess material extending beyond one or both of the opposite outer edges of the hole, is trimmed off adjacent to the opposite surfaces 33 and 34 of the metal sheet 30, along the surfaces at 36. If desired, a sealant overcoat, such as a polysulfide sealant, can be applied to the outer surfaces of the plug, at opposite sides of the hole and within the hole, to further ensure sealing of the hole.

Referring to FIG. 3 there is shown a preferred embodiment of the plug of the invention. The plug 40 of FIG. 3 is of similar construction as the plug 10 of FIGS. 1 and 2, in that it is comprised of a solid rubber elongated tapered body member 42 of circular cross-section, formed of a series of successively axially disposed radially reduced tapered portions 14 having substantially the same angle of radial taper at 20, and a lead-in tip 26 integrally connected to the body member 42 at the tapered end 18 of the plug.

However, in plug 40 there is provided a solid cylindrical member 44 integrally connected to the large end 16 of the plug, to aid in molding and in handling the plug. Further, a shoulder or bifurcated portion 46 on the large end 50 of each of the tapered portions 14 connects the tapered or small ends 48 of the successive larger tapered portions 14 with the large end 50 of the adjacent tapered portions 14. The shoulder member is tapered or inclined at 49 in a direction opposite to the main direction of taper of the taper portions 14.

Such bifurcated portions 46 formed between adjacent tapered portions 14, together with the outer edge 51 of the adjacent large ends 50 of the respective tapered portions 14 form barbs and locking members against the inside surfaces and edges of holes in structural members such as a fuel tank when the plug 40 is inserted into and pulled through the hole. There is also connected to the lead-in tip 26 of this embodiment an axially extending wire 52 embedded at its inner end in the lead-in tip, to further aid in quick and easy insertion into, and locking of the plug in, a hole to be sealed.

FIGS. 4 and 5 illustrate another embodiment of the invention plug. The rubber plug 54 of this embodiment has substantially the same construction as the plug 40 of FIG. 3, in that it is comprised of a solid rubber elongated body member 56 formed of a series of successively axially disposed radially reducing tapered portions 58 having substantially the same angle of radial taper at 60 and bifurcated portions 62 between the tapered ends 64 of the successive larger tapered portions 58 and the large ends 66 of the adjacent tapered portions 58. This embodiment also includes a lead-in tip 68, an outwardly extending wire 70 connected to the lead-in tip, and a solid end member 71 integral with the large end of the plug.

However, the body member 56 and the tapered portions 58 thereof have a rectangular cross section, as shown at 72 in FIG. 5. The plug of this embodiment therefore, is designed for sealing holes having an essentially rectangular cross section in metal structures such as fuel tanks.

Various modifications of the invention device can be made. Thus, for example, if desired, the taper angle of the successive tapered portions of the plug body can vary, and some of the tapered portions can have somewhat different angles of reducing radial taper than other tapered portions, instead of having substantially the same angle of taper. Also, the cross section of the body member and of the tapered portions can be further varied; for example such cross section can be elliptical or polygon shaped, as desired. The number of tapered portions axially disposed along the plug body can also be varied as desired.

From the foregoing, it is seen that the invention provides an improved simple and reliable elastomeric plug having a tapered and barbed locking design, of reduced cost, particularly for sealing holes in metal containers, especially metal aircraft fuel tanks, and provides a more positive fuel seal. The plug can be used for plugging holes of varying sizes and irregularly shaped holes in metal structures. The plug of the invention is particularly useful in sealing corner openings and holes of irregular shape resulting from structural joints in fuel tanks. While the elastomeric plug of the invention has been described in relation and is particularly applicable to seal holes in containers for liquids, particularly in metal fuel tanks, it will be understood that such plug can be utilized to seal holes in any structure, especially metal structures. The elastomeric plug of this invention is corrosion resistant and is inert to liquid chemicals, particularly aircraft fuels.

Since further changes and modifications of the invention will occur to and can be made readily by those skilled in the art without departing from the invention concept, the invention is not to be taken as limited except by the scope of the appended claims.

What is claimed is:

1. A plug for hole sealing comprising an elastomeric solid tapered body member formed of a plurality of integral tapered portions of successively reduced taper extending substantially from one end to the other end of said body member, each tapered portion having an exposed outer edge, providing a tapered and barbed configuration, and a lead-in tip connected to the body member at the tapered end thereof.

2. The plug of claim 1, each of the tapered portions being truncated, one end of each tapered portion being larger in radial extent than the tapered end of an adjacent tapered portion, the larger ends of the successive tapered portions having an exposed outer edge, forming a barb and locking member.

3. The plug of claim 2, each of the tapered portions having the same angle of taper.

4. The plug of claim 2, including a shoulder member on the large end of each of the tapered portions, connecting the small end of the successive larger tapered portions with the large end of the adjacent tapered portion, said shoulder member being tapered in a direction opposite to the main direction of taper of said tapered portions.

5. The plug of claim 2, including a wire connected to said lead-in tip.

6. The plug of claim 2, said body member and tapered portions having a circular cross section.

7. The plug of claim 2, said body member and tapered portions having a rectangular cross section.

8. A plug particularly adapted for sealing holes in fuel tanks comprising
   a solid flexible rubber elongated and tapered body member formed of a series of successively reduced integral axially disposed tapered portions, each of said tapered portions having substantially the same angle of taper, the large end of each tapered portion being larger in radial extent than the tapered end of the adjacent tapered portion,
   a bifurcated portion connecting the tapered ends of the successive larger tapered portions with the large ends of the adjacent tapered portions, said bifurcated portions being tapered in a direction opposite to the main direction of taper of said tapered portions,
   said bifurcated portions and the edges of the adjacent large ends of said tapered portions forming barbs and locking members against the inner surfaces and edges of holes when the plug is pulled through a hole in the fuel tank, and
   a lead-in tip connected to the smallest tapered portion at the tapered end of said body member.

9. The plug of claim 8, including an axially extending wire embedded at its inner end in said lead-in tip.

10. The plug of claim 8, said body member and tapered portions having a circular cross section.

11. The plug of claim 8, said body member and tapered portions having a rectangular cross section.

12. In combination, a container having a hole therein, said hole being plugged by a plug comprising an elastomeric solid tapered body member formed of a plurality of integral tapered portions of successively reduced taper extending substantially from one end to the other end of said body member, each tapered portion having an exposed outer edge, providing a tapered and barbed configuration, the hole being plugged by compressive contact of one or more of said tapered portions against the hole surfaces and edges, said plug being trimmed adjacent opposite sides of the hole to remove excess material.

13. The combination of claim 12, including a sealant overcoat on the outer surfaces of the trimmed plug at opposite sides of said hole.

14. In combination, a fuel tank having a hole therein, said hole being plugged by a plug comprising a solid flexible rubber elongated and tapered body member formed of a series of successively reduced integral axially disposed tapered portions, each of said tapered portions having substantially the same angle of taper, the large end of each tapered portion being larger in radial extent than the tapered end of the adjacent tapered portion, and a bifurcated portion connecting the tapered ends of the successive larger tapered portions with the large ends of the adjacent tapered portions, said bifurcated portions being tapered in a direction opposite to the main direction of taper of said tapered portions, the hole being plugged by compressive contact of one or more of said tapered portions against the hole surfaces and edges, said plug being trimmed at the opposite ends to remove excess material.

15. The combination of claim 14, including a sealant overcoat on the opposite trimmed ends of said plug adjacent said hole.

* * * * *